US011318832B2

(12) United States Patent
Boecker et al.

(10) Patent No.: US 11,318,832 B2
(45) Date of Patent: May 3, 2022

(54) STIFFENING ASSEMBLY FOR A FUEL TANK

(71) Applicant: TI AUTOMOTIVE TECHNOLOGY CENTER GMBH, Rastatt (DE)

(72) Inventors: Albert J. Boecker, Ettlingen (DE); Ahmad Chehade, Karlsruhe (DE); Alex Ehler, Rastatt (DE); Patrick Gmuend, Karlsruhe (DE); Peter Grauer, Steinweiler (DE); Moez Haouala, Karlsruhe (DE); Gerrit A. Michaelis, Friesenheim (DE); Matthias B. Olbrich, Rastatt (DE)

(73) Assignee: TI AUTOMOTIVE TECHNOLOGY CENTER GMBH, Rastatt (DE)

( * ) Notice: Subject to any disclaimer, the term of this patent is extended or adjusted under 35 U.S.C. 154(b) by 208 days.

(21) Appl. No.: 16/853,576

(22) Filed: Apr. 20, 2020

(65) Prior Publication Data

US 2020/0247232 A1   Aug. 6, 2020

Related U.S. Application Data

(60) Continuation of application No. 16/003,174, filed on Jun. 8, 2018, now Pat. No. 10,668,805, which is a division of application No. 15/004,393, filed on Jan. 22, 2016, now Pat. No. 10,703,194.

(60) Provisional application No. 62/106,404, filed on Jan. 22, 2015.

(51) Int. Cl.
*B60K 15/03* (2006.01)
*B29C 49/20* (2006.01)
*B29C 51/12* (2006.01)

(52) U.S. Cl.
CPC .............. *B60K 15/03* (2013.01); *B29C 49/20* (2013.01); *B29C 51/12* (2013.01); *B60K 15/03177* (2013.01); *B29C 2049/2013* (2013.01); *B60K 2015/03032* (2013.01); *B60K 2015/03381* (2013.01); *B60K 2015/03467* (2013.01)

(58) Field of Classification Search
CPC . B29C 49/20; B29C 51/12; B29C 2049/2013; B60K 15/03; B60K 15/03177; B60K 2015/03381; B60K 2015/03467; B60K 2015/03032
USPC .......................................... 220/562; 156/242
See application file for complete search history.

(56) References Cited

U.S. PATENT DOCUMENTS

| 1,757,923 | A | * | 5/1930 | Russell | .................. | B65D 90/00 |
|   |   |   |   |   |   | 220/653 |
| 3,368,708 | A | * | 2/1968 | Pfledererfredr | ...... | B65D 90/029 |
|   |   |   |   |   |   | 220/590 |

(Continued)

FOREIGN PATENT DOCUMENTS

WO   2015067491 A2   5/2015

*Primary Examiner* — Ernesto A Grano
(74) *Attorney, Agent, or Firm* — Dickinson Wright PLLC

(57) ABSTRACT

A method of forming a tank with a stiffening assembly includes forming a fuel tank such that the tank wall carries at least a first and second insert, locating a connecting assembly within the tank interior aligned with the first and second inserts, the connecting assembly including a tubular body, a first coupler, and a second coupler, and coupling at least a portion of the first insert with the first coupler and at least a portion of the second insert with the second coupler to limit movement of the two wall portions relative to each other.

12 Claims, 3 Drawing Sheets

(56) References Cited

U.S. PATENT DOCUMENTS

| | | | |
|---|---|---|---|
| 6,135,306 A * | 10/2000 | Clayton | ........... B60K 15/03177 220/501 |
| 6,978,802 B2 * | 12/2005 | Hagano | ................... B29C 49/20 137/560 |
| 8,991,637 B2 | 3/2015 | Boecker et al. | |
| 10,000,003 B2 | 6/2018 | Bergmann et al. | |
| 2003/0141304 A1 | 7/2003 | Franjo et al. | |
| 2005/0011891 A1 * | 1/2005 | Austerhoff | ....... B60K 15/03006 220/4.12 |
| 2009/0286027 A1 | 11/2009 | Fleischmann | |
| 2009/0324866 A1 | 12/2009 | Bocker et al. | |
| 2012/0024868 A1 * | 2/2012 | Menke | ................... B60K 15/03 220/653 |
| 2012/0037638 A1 | 2/2012 | Criel et al. | |
| 2014/0014663 A1 | 1/2014 | Eulitz et al. | |
| 2014/0158696 A1 | 6/2014 | Criel et al. | |

\* cited by examiner

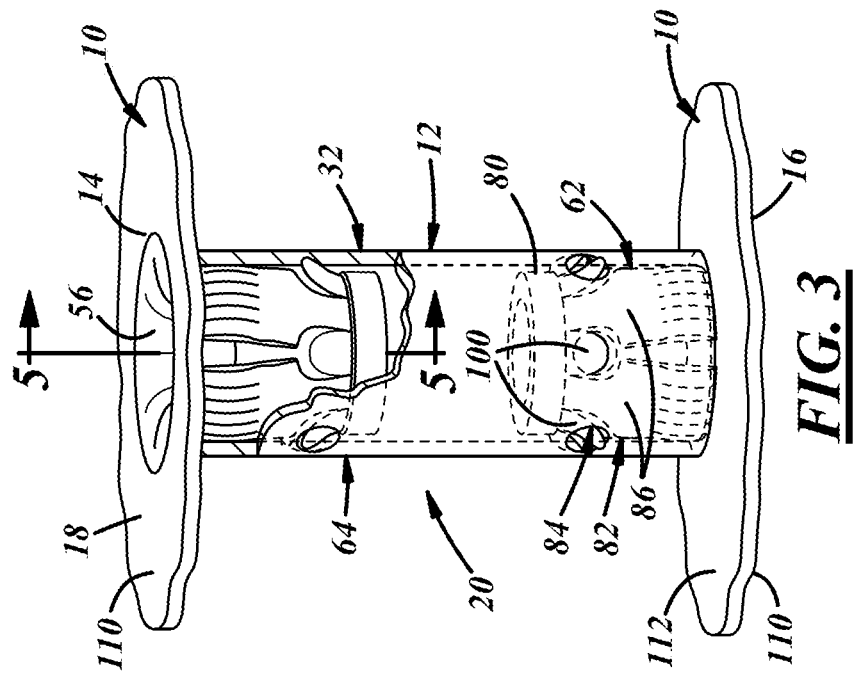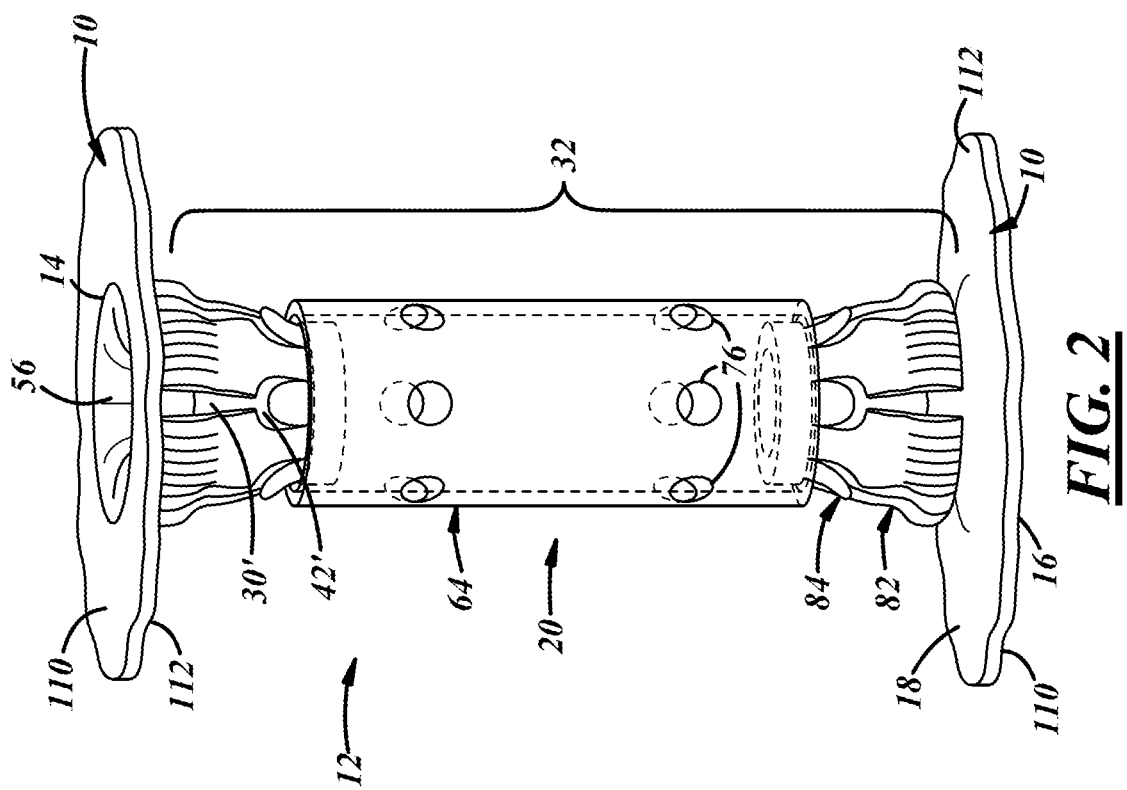

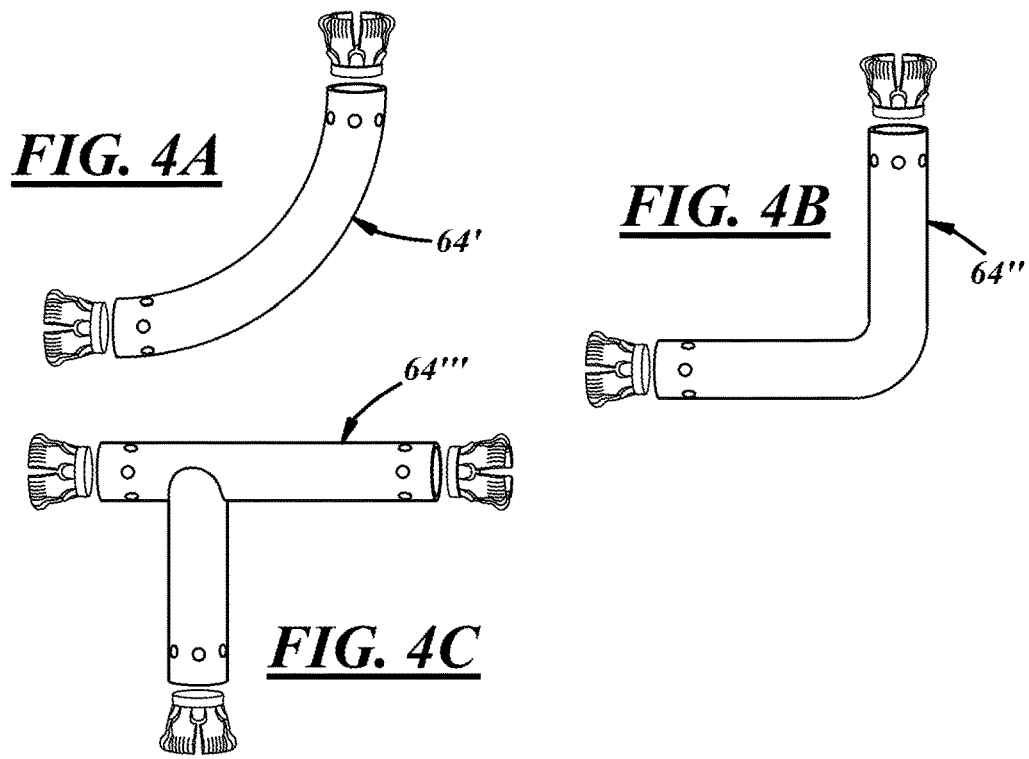
*FIG. 4A*
*FIG. 4B*
*FIG. 4C*
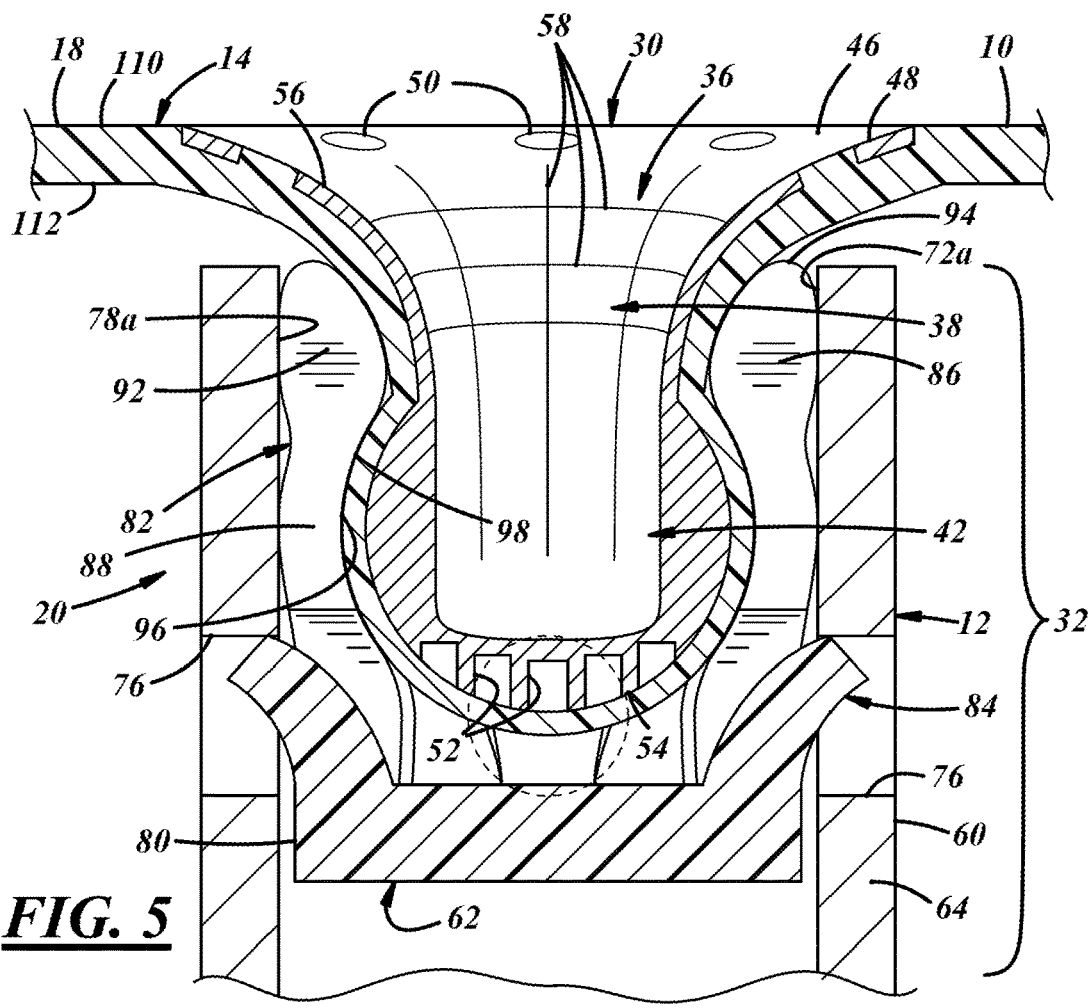
*FIG. 5*

STIFFENING ASSEMBLY FOR A FUEL TANK

CROSS-REFERENCES TO RELATED APPLICATION

This application is a continuation application of U.S. Divisional application Ser. No. 16/003,174 filed on Jun. 8, 2018, which claims the benefit of U.S. Non-Provisional application Ser. No. 15/004,393 filed on Jan. 22, 2016, which claims the benefit of U.S. Provisional Application Ser. No. 62/106,404 filed on Jan. 22, 2015, entitled "STIFFENING ASSEMBLY FOR A FUEL TANK," the entire contents of which are incorporated herein by reference.

FIELD

The present disclosure relates generally to a structure supporting a fuel tank under pressure.

BACKGROUND

Fuel tanks for automotive vehicles have been made from metal and plastic materials. Fuel tanks are formed in various sizes and shapes as required for the various applications in which they are used. Fuel tanks used in passenger vehicles must meet certain requirements relating to, for example, resistance to rupture upon impact and permeability to hydrocarbons in fuel vapor. Typical plastic fuel tanks include a single wall of material and that wall may be formed from a single material or multiple layers of different materials. Particularly in fuel tanks, there is a need to make containers having more than one wall or layer of different materials in order to meet various requirements, for example with respect to mechanical stability and resistance to higher pressures in modern systems. Up to now the making of such containers requires complex multi-step manufacturing methods.

SUMMARY

The present disclosure provides a method of manufacturing a fuel tank. According to an exemplary form of the present disclosure, the method includes the steps of forming a fuel tank, wherein the tank carries at least a first and second insert on an exterior of the tank at two spaced apart wall portions of the tank, shaping the tank wall portions carrying the insert so that the insert defines a projection that extends at least partially radially inwardly into a tank interior, coupling a first attachment portion of each of first and second couplers to the each of the first and second inserts, the first attachment portions having flexible fingers extending around the projection formed by the inserts with the tank wall portions extending uninterrupted therebetween, locating a tubular body within the tank interior and aligned with the first and second inserts, the tubular body having opposing first and second ends defining openings, and coupling the first and second ends of the tubular body with the first and second couplers such that an interior surface of the first and second ends of the tubular body axially overlap and engage the flexible fingers of the first and second couplers to maintain their position extending around the inserts, whereby the tubular body spans between the two spaced apart wall portions of the tank to limit movement of the two wall portions relative to each other.

According to more detailed aspects of the present disclosure, the first and second couplers each include protrusions biased radially outwardly from first and second couplers and the first and second ends of the tubular body have detents or apertures. The step of coupling the first and second ends of the tubular body with the first and second couplers includes engaging the protrusions with the detents or apertures. The step of engaging the protrusions with the detents or apertures is accomplished by aligning the protrusions with the detents or apertures and resiliently returning the biased protrusions toward an initial state of the protrusions such that a portion of the protrusions extends outwardly through the detents or apertures. In addition, the first and second couplers each include a collar from which the flexible fingers and the protrusions extend such that the flexible fingers and the protrusions each have a fixed end attached to the collar and a free end extending from the collar. The step of coupling the first and second ends of the tubular body with the first and second couplers further includes placing the collar of the first and second couplers into the first and second ends of the tubular body by a sliding or interference fit.

According to more detailed aspects of the present disclosure, the fuel tank is formed in a molding having portions movable between open and closed positions, and the step of coupling the first and second ends of the tubular body with the first and second couplers is accomplished by movement of the mold portions toward the closed position of the mold. In the open position of the mold, a collar with a part of the protrusions of the first and second couplers are at least partially received within the openings defined in the opposing first and second ends of the tubular body such that the part of the protrusions are displaced inwardly and frictionally engaged with the interior surface of the tubular body. In the closed position of the mold, the plurality of fingers of the first and second couplers are received within the tubular body so that the fingers radially overlap heads of the first and second inserts and are overlapped by the interior surface of the first and second ends of the tubular body. The each of the first and second couplers is coupled to the tubular body simultaneously with coupling the each of the first and second couplers to the each of the first and second inserts.

According to another aspect of the present disclosure, a method of manufacturing a fuel tank is provided. The method may include the steps of forming the fuel tank, wherein the tank carries at least a first insert and a second insert on an exterior of the tank at two spaced apart wall portions of the tank, shaping the tank wall portions carrying the insert so that the insert defines a projection that extends at least partially radially inwardly into a tank interior, locating a tubular body within the tank interior, aligned with the first and second inserts, the tubular body having opposing first and second ends defining openings, placing first and second couplers each having a collar, first attachment portions, and second attachment portions between the each of the first and second ends of the tubular body and the projection of the tank wall formed by the each of the first and second inserts, and coupling the each of the first and second couplers to the first and second ends of the tubular body simultaneously with coupling the each of the first and second couplers to the each of the first and second inserts such that the each opening in the first and second ends of the tubular body receives the collar and a part of the second attachment portions formed in the each of the first and second couplers in an initial assembly position and the first attachment portions extending from the collar formed in the first and second couplers are overlapped by an interior surface of the first and second ends of the tubular body in a final assembly position, whereby the first attachment portions overlap around the projection formed by the inserts with the tank wall portions extending uninterrupted therebetween.

According to more detailed aspects of the present disclosure, the tubular body spans between the two spaced apart wall portions of the tank to limit movement of the two wall portions relative to each other in the final assembly position. The first attachment portions of the first and second couplers include flexible fingers having a fixed end attached to the collar and a free end extending from the collar, and the flexible fingers extend over the projection formed by the inserts with the tank wall portions. The second attachment portions of the first and second couplers include protrusions biased radially outwardly from first and second couplers, and the first and second ends of the tubular body have detents or apertures. The step of coupling the first and second couplers with the first and second ends of the tubular body includes engaging the protrusions with the detents or apertures.

BRIEF DESCRIPTION OF THE DRAWINGS

The following detailed description of preferred embodiments and best mode will be set forth with reference to the accompanying drawings, in which:

FIG. 2 is a perspective view of the stiffening assembly of FIG. 1 in a partially assembled state;

FIG. 3 is a perspective view of the stiffening assembly of FIG. 1 in a fully assembled state;

FIGS. 4A-4C illustrate additional embodiments of the stiffening assembly; and

FIG. 5 is a partial, cross-sectional view of a portion of the stiffening assembly and part of a fuel tank wall along section lines 5-5 of FIG. 3.

DETAILED DESCRIPTION

Figure 1:
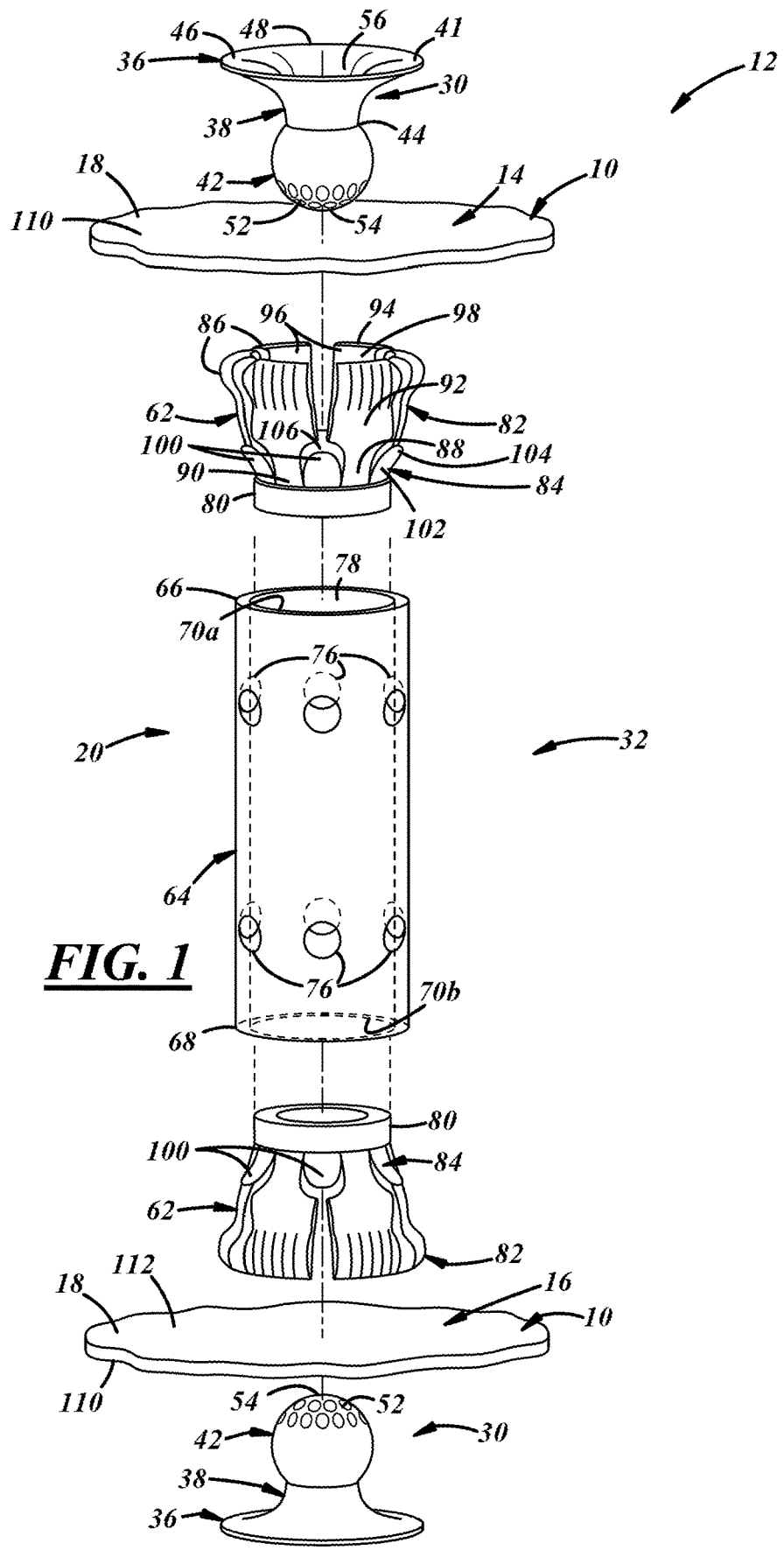
FIG. 1 is an exploded view of a portion of a fuel tank and a stiffening assembly within the fuel tank.

Referring in more detail to the drawings, FIG. 1 illustrates a portion of a fuel tank 10 (in a parison form) and a stiffening assembly 12 coupling two portions 14, 16 of a fuel tank wall 18. The stiffening assembly 12 provides structural support for the fuel tank 10 and minimizes deformation of the shape of the fuel tank (e.g., due to temperature changes, pressure changes, or both).

The fuel tank wall 18 defines an enclosed volume or interior 20 for carrying liquid fuel. The wall 18 may have any suitable thickness; further, the thickness of the wall may vary depending on the location in the tank 10. And the tank may be comprised of any suitable material, such as (but not limited to) a multi-layer plastic construction having one or more structural layers, one or more adhesive layers, and one or more vapor barrier layers.

The stiffening assembly 12 comprises two or more inserts 30 and a connecting assembly 32. As will be explained below, the inserts 30 are carried by the fuel tank wall 18, and the connecting assembly 32 spans between and couples one insert to the other thereby stiffening or supporting two connected or adjoined regions or portions 14, 16 of the fuel tank wall.

The inserts 30 may be identical; therefore, only one will be described below. The insert 30 has a base 36, a reduced diameter neck 38 axially extending from the base, and a head 42 extending from the neck. The illustrated base has a generally annular shape and is partially defined by a radially outwardly extending flange 46. In one embodiment, the periphery of the flange 46 is circular; however, the base 36 and/or flange 46 may have different shapes as desired. In at least some implementations, at least a portion of the flange 46 is radially wider than a portion of the neck 38.

The neck 38 may radially narrow as it extends axially from the base 36, providing a generally conical or frusto-conical shape. Alternatively, as in the illustrated embodiment, the neck may be curved between the base and head providing a partially hyperbolic shape. In some implementations, at least a portion of the neck 38 is radially narrower than a portion of the head 42. The neck 38 may be circumferentially continuous, if desired, or it may have recesses or other voids formed in it to improve connection of the tank to the insert 30.

The head 42 is connected to the neck 38 extending axially away therefrom, and at least a portion of the head 42 may be radially wider than at least a portion of the neck 38 adjacent to the head. In the implementation shown, the head is generally spherical; however again, this is merely an example. Other shapes are possible. The head 42 may have one or more voids 52 at a distal end 54. The voids 52 may be cavities or blind holes, through holes, or any combination thereof. For example, the cross-section shown in FIG. 5 illustrates the voids 52 as blind holes.

The base 36, neck 38, and head 42 of the insert may be integrally formed in one piece of material, such as by molding (e.g., a unibody construction). In at least one implementation, the insert 30 is formed of a polymeric, composite, or metal material.

The insert 30 may be at least partially hollow—having a cavity 56 opening at one side 41 of the base and extending towards the head 42 (see also FIG. 5). As will be described in greater detail below, the cavity 56 may be used to carry the insert 30 in a manufacturing mold so that the insert may be incorporated into a parison of the fuel tank 10. The cavity may be any suitable shape; and in some implementations, the insert 30 may not have a cavity.

FIG. 5 further illustrates that the insert 30 may have one or more ribs 58 that extend inwardly and define part of the cavity 56. To reinforce the strength of the insert 30, the ribs 58 may extend at least partially circumferentially and/or at least partially from the base 36 towards the head 42.

The insert 30 may include cavities or other voids, including openings therethrough, in one or more of the base 36, neck 38, and head 42 to facilitate connection of the insert to the fuel tank wall 18. For example, according to one embodiment shown in FIG. 5, the insert may comprise one or more circumferentially-spaced through holes 50 on the base 36 to further facilitate bonding of the insert to the parison fuel tank during manufacturing. Other embodiments do not comprise holes 50. The insert 30 is adapted to cooperate with the connecting assembly 32 to interconnect spaced apart portions 14, 16 of the fuel tank wall.

Returning to FIG. 1, the connecting assembly 32 includes a cylindrical, tubular body 64 extending from a first end 66 to a second end 68 and two couplers 62. Each end 66, 68 may have an opening 70a, 70b extending from the respective end axially inwardly. In the illustrated embodiment, the body 64 is hollow and the openings 70a, 70b are in communication with one another; however, this is not required. One or more circumferentially spaced detent elements 76 may be provided in the body 64 at or adjacent to the first end 66 and one or more similar detent elements may be provided at or adjacent to the second end 68. For example, in the illustrated embodiment, six circumferentially spaced detent elements 76 are shown at each end. The detent elements 76 are shown as circular through-holes; however, this is merely an example and other implementations are possible—e.g., the elements 76 need not be circular nor need the elements pass entirely through the support body 64 (e.g., the element 76 may be a cavity or depression extending radially outwardly from an inner surface 78 of the body 64. Or, for example, the detent elements could be inwardly extending protrusions adapted to couple to openings or cavities on the couplers 62.

In FIG. 1, the body 64 is straight; however, other implementations also exist (see FIGS. 4A, 4B, 4C having support bodies 64', 64", 64''', respectively). For example, the support may be curved or angled. It may have a T-shape, a Y-shape, a cross-shape, an X-shape, etc. (e.g., having three or more openings and passages). These of course are examples, and other embodiments also exist.

As shown in FIGS. 1-3, in at least one embodiment, a separate coupler 62 is coupled to each end 66, 68 of the body 64, and the couplers at each end 66, 68 of the body may be identical, so only one coupler 62 will be described in detail hereafter. The coupler 62 comprises a collar 80, a first attachment portion 82 and a second attachment portion 84. The first attachment portion 82 is adapted to interconnect the coupler 62 and the fuel tank 12 while the second attachment portion 84 is adapted to interconnect the coupler 62 to the body 64. The collar 80 is sized to be received within the opening 70a (or 70b) by a sliding or interference fit. The collar 80 is shown having an annular, cylindrical shape, but of course, other shapes are also possible.

In the illustrated embodiment, the first attachment portion 82 includes one or more fingers 86 attached at one end 90 to and extending from the collar 80 to a free end 94 (six fingers are shown, although any number may be used). The fingers may extend generally axially from the collar and may be radially inclined so that the free ends 94 extend radially outwardly relative to the collar 80. The fingers 86 may also be flexible, or pivoted relative to the collar 80, such as about a living hinge defined at the fixed end 90, so that the free ends 94 may move radially inwardly. Hence, the fingers 86 may have a first state where the distance between the inner surfaces of the free ends of the fingers is greater than in a second state of the fingers when at least a portion of the fingers are flexed or moved inwardly. In the implementation shown, the fingers 86 include a narrow portion 88 at the fixed end 90 leading to a wider portion 92 that defines the free end 94. Each finger 86 may be provided in or biased to a radially outwardly position and is flexible to move inwardly when a sufficient force is applied to it. The six fingers 86 may be evenly, circumferentially spaced around the collar 80. The inner surface of each finger may be concave so that the fingers collectively define a pocket 96 (see also FIG. 5). The pocket 96 is adapted to receive at least a portion of the head 42 of the insert 30, as will be described later.

In the illustrated embodiment, the second attachment portion 84 includes multiple protrusions 100 also carried by and, in at least some implementations, cantilevered from the collar 80 so that they have a fixed end 102 and a free end 104 (six protrusions are shown although any number may be used). The protrusions may be evenly spaced around the collar and may be alternated with the fingers 86, if desired. Of course, other arrangements may be used as desired. Like the fingers 86, the protrusions 100 may extend axially and radially outwardly from their fixed ends 102 toward their free ends 104. In one embodiment, the protrusions 100 terminate where the wider portion 92 of the fingers 86 begin and a gap 106 is provided surrounding the protrusions 100 so that the protrusions are generally independent of the fingers. In at least one embodiment, each protrusion 100 is provided in or biased to a radially outwardly inclined position having at least a portion that extends radially outwardly farther than the adjacent portion of the fingers 86. Each protrusion 100 may be flexible so that at least a portion is moveable or may be bent radially inwardly; e.g., flexing at or near the collar 80, such as about a living hinge provided between the collar 80 and protrusion 100. And each protrusion may be resilient to return radially outwardly at least partially back to its unflexed position when a force on the protrusion is sufficiently reduced or removed.

FIGS. 1-3 collectively illustrate at least a portion of a manufacturing process for a fuel tank. In one embodiment, the tank 10 and its wall 18 may be molded from a polymeric material in a mold having two halves that define a mold cavity that defines the outer shape of the fuel tank. In the fuel tank forming process, the mold halves may be opened and the inserts 30 may be positioned within the mold halves before the polymeric material is provided into the mold cavity. In at least some implementations, the inserts 30 are oriented with the base 36 and/or cavity 56 engaged with or carried by each mold half and the head 42 extending inwardly into the mold cavity. The inserts 30 may be provided in pairs, with a first insert carried by one mold half and a second insert carried by the other mold half and aligned with the first insert. Hence, when the mold halves are closed together to define the mold cavity, the inserts 30 are moved toward each other and remain aligned (in at least some implementations).

An extruded parison used to form the fuel tank may be provided into the mold, between the separated mold halves. Next, the mold halves may be at least partially closed and pressurized gas (e.g., air) may be provided into an interior of the parison using a blow pin to pre-blow the parison outwardly into the mold cavity. During the expansion, the head 42 and neck 38 of the inserts 30 may be covered with the parison material which conforms to their shape, and the base 36 may be at least partially embedded therein. Thus, the expansion may shape at least a portion of the tank wall 18 so that each of the inserts 30 define a projection that extends at least partially radially inwardly into the tank interior. These projections may be defined by the size and shape of the head 42, the neck 38, and/or even the base 36, as well as well as the thickness of the parison; thus, for example, the projections may have any desired diameter(s) (and varying diameters/shape), inwardly extending length, etc.

Thereafter, the parison material may separate into parison halves or portions, such as by cutting or tearing the parison, with one parison half in each mold half. The mold halves then may be opened to expose the interior of the parison halves. This provides access to the interior of the parison so that fuel tank components, such as the connecting assembly 32, may be located within the interior of the parison. One such method of forming a parison and separating a parison into parison halves in order to locate components therein is disclosed in U.S. patent application Ser. No. 12/491,964, the disclosure of which is incorporated by reference herein in its entirety.

With the mold opened, the connecting assembly 32 is introduced between the mold halves and the parison halves. Here, the couplers 62 are provided in an initial assembly position, as shown in FIG. 2. In this initial position, the collars 80 are at least partially received within the tube openings 70a, 70b, optionally with the protrusions 100 received within the respective opening, displaced inwardly and frictionally engaged with the inner surface 78 of the tubular body 64. In this initial assembly position, the connecting assembly 32 is positioned between the mold halves with the pockets 96 defined by the coupler fingers 86 being aligned with the heads 42 of the inserts 30. The connecting assembly 32 may be held in this position on an arm (e.g., a robot arm) or other actuator holding the connecting assembly 32 until the couplers 62 initially receive the heads 42 between the free ends 94 of the fingers 86, and then the arm may be withdrawn from between the mold halves so that the mold may be further and eventually, fully closed.

While the mold halves close, the heads 42 of the inserts 30 are received within the pockets 96 of the couplers 62 and the free ends 94 of the fingers 86 eventually engage the tank material overlying the base 36. Further closing of the mold presses the couplers 62 into the tubular body 64 simultaneously at each end 66, 68, and radially inwardly flexes the fingers 86 as the fingers are increasingly received within the body 64. Upon full closure of the mold, as shown in FIG. 3, the protrusions 100 are aligned with the detent elements 76 and the protrusions 100 resiliently return radially outwardly to or toward their initial state such that a portion of the protrusions 100 extends outwardly into or through the detent elements 76. Also, the fingers 86 are received within the body 64 sufficiently to radially inwardly displace the fingers sufficiently so that the fingers radially overlap the heads 42 of the inserts 30 so that the heads are trapped within the pockets 96 defined in the couplers 62. The components remain in this position as the parison material is finally formed (e.g. final blow pressure is applied within the parison interior). The material hardens and the formed fuel tank 10 is removed from the mold.

In this position, outward movement of the fingers 86 is prevented by the overlapping tubular body 64, and movement of the body relative to the couplers 62 is prevented by engagement of the protrusions 100 with the body 64 from within the detent elements 76. In this way, the head 42 of each insert 30 remains trapped in an associated pocket 96, and the fuel tank wall 18 portions remain interconnected. So connected, the portions 14, 16 of the fuel tank wall that are interconnected by the connecting assembly 32 are inhibited or prevented from any significant movement away from or toward each other. This is due at least in part to the fuel tank wall 18 being securely trapped between the respective heads 42 of the inserts 30 and the couplers 62 such that forces tending to separate the fuel tank walls are transferred to the tubular body 64 (via the inserts 30 and couplers 62) which may be rigid and substantially inextensible.

Further, the stress on the tank 10 from such forces is experienced over a relatively large surface area at the interface between the insert base 36 and the tank wall 18 to prevent undue stress on any portion of the fuel tank. By increasing the surface area of the flange 46, the forces on the tank wall can be further dissipated, as desired for a particular application. By way of example, forces tending to separate the fuel tank walls 18 (e.g. expand the fuel tank outwardly) may occur due to increased pressure within the tank, or the weight of fuel in a full tank acting on the fuel tank wall. Further, temperature increases (both ambient temperature outside of the fuel tank 10 and the temperature within the fuel tank) can decrease the stiffness, rigidity, or strength of a polymeric fuel tank. Therefore, the fuel tank 10 with the stiffening assembly 12 may be used to contain fluid at increased pressures and/or with increased temperatures compared to tanks without such stiffening or connecting features. And, due to the increased stiffness and rigidity of the fuel tank provided by the stiffening assembly 12, a thinner fuel tank wall 18 can be used in applications compared to fuel tanks 10 without the assembly 12, which may lead to a cost savings and, in some instances, a weight savings.

The above described process is one example of a fuel tank formation process. Other processes may be used to form a fuel tank with the stiffening assembly 12 therein. For example, a fuel tank may be formed from an uncut or undivided cylindrical parison introduced between two open mold halves each carrying an insert 30, similar to that described above. An arm may introduce a carrier carrying the connecting assembly 32 through an open end of the parison aligning the couplers 62 with the inserts 30. The mold halves may be partially closed, an opposing end of the parison may be at least partially closed using a gripper mechanism, and pressurized air may be provided into the parison to initially and partially expand it. The mold halves may be partially closed until the couplers 62 at least partially receive the heads 42 of the inserts 30, as described above. Thereafter, the arm may be removed leaving the carrier and connecting assembly 32 in place, and then, the mold halves may be fully closed fully engaging the connecting assembly with the inserts 30, having the parison trapped therebetween. During this process, and even after the mold is fully closed, additional pressurized air may be provided into the parison—e.g., to maintain the parison open and prevent it from collapsing and to form the parison into the desired fuel tank shape. Other aspects of this method are disclosed in U.S. Pat. No. 6,712,234, the disclosure of which is incorporated by reference herein in its entirety.

In another assembly example, a fuel tank may be formed from sheets of material, such as in a vacuum forming or other type of process. With mold halves opened, material may be provided into both mold halves, overlapping the inserts 30. The material may then be formed into the cavities such as by vacuum forming. As described above, the connecting assembly 32 may be provided between the mold halves before they are closed so that the connecting assembly 32 is coupled to the inserts 30 as the mold halves close to form the fuel tank.

In another example, the connecting assembly 32 is provided into a fuel tank and coupled thereto after the tank is formed. In this embodiment, the tank is formed by overmolding the inserts 30 as described above. Once the tank material has hardened, the connecting assembly 32 may be located within the interior 20 of the tank such as by being inserted through a hole in the tank wall 18.

Next, the fuel tank walls 18 may be separated sufficiently to permit the connecting assembly 32 to be received between the portions 14, 16 of the tank wall that overlie the inserts 30—the couplers 62 not being fully received within the tubular body 64. The couplers 62 may be aligned with the inserts 30. Then, the fuel tank wall portions may be moved closer together to push each coupler 62 into the tubular body 64 while also engaging the heads 42 of the inserts 30 into the body 64 of the connecting assembly 32, similar to that described above. Once the first attachment portion 82 is engaged to the insert heads 42 and the second attachment portion 84 is engaged with the body 64, the assembly is complete.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A method of manufacturing a fuel tank, the method comprising the steps of:

forming the fuel tank, wherein the tank carries at least a first and second insert on an exterior of the tank at two spaced apart wall portions of the tank;

shaping the tank wall portions carrying the insert so that the insert defines a projection that extends at least partially radially inwardly into a tank interior;

coupling a first attachment portion of each of first and second couplers to the each of the first and second inserts, the first attachment portions having flexible fingers extending around the projection formed by the inserts with the tank wall portions extending uninterrupted therebetween;

locating a tubular body within the tank interior and aligned with the first and second inserts, the tubular body having opposing first and second ends defining openings; and coupling the first and second ends of the tubular body with the first and second couplers such that an interior surface of the first and second ends of the tubular body axially overlap and engage the flexible fingers of the first and second couplers to maintain their position extending around the inserts, whereby the tubular body spans between the two spaced apart wall portions of the tank to limit movement of the two wall portions relative to each other.

2. The method of claim 1, wherein the first and second couplers each include protrusions biased radially outwardly from the first and second couplers, and wherein the first and second ends of the tubular body have detents or apertures, and wherein the step of coupling the first and second ends of the tubular body with the first and second couplers includes engaging the protrusions with the detents or apertures.

3. The method of claim 2, wherein the step of engaging the protrusions with the detents or apertures is accomplished by aligning the protrusions with the detents or apertures and resiliently returning the biased protrusions toward an initial state of the protrusions such that a portion of the protrusions extends outwardly through the detents or apertures.

4. The method of claim 2, wherein the first and second couplers each include a collar from which the flexible fingers and the protrusions extend such that the flexible fingers and the protrusions each have a fixed end attached to the collar and a free end extending from the collar, and wherein the step of coupling the first and second ends of the tubular body with the first and second couplers further includes placing the collar of the first and second couplers into the first and second ends of the tubular body by a sliding or interference fit.

5. The method of claim 2, wherein the fuel tank is formed in a mold having portions movable between open and closed positions, and the step of coupling the first and second ends of the tubular body with the first and second couplers is accomplished by movement of the mold portions toward the closed position of the mold.

6. The method of claim 5, wherein in the open position of the mold, a collar with a part of the protrusions of the first and second couplers are at least partially received within the openings defined in the opposing first and second ends of the tubular body such that the part of the protrusions are displaced inwardly and frictionally engaged with the interior surface of the tubular body.

7. The method of claim 5, wherein in the closed position of the mold, the plurality of fingers of the first and second couplers are received within the tubular body so that the fingers radially overlap heads of the first and second inserts and are overlapped by the interior surface of the first and second ends of the tubular body.

8. The method of claim 1, wherein the each of the first and second couplers is coupled to the tubular body simultaneously with coupling the each of the first and second couplers to the each of the first and second inserts.

9. A method of manufacturing a fuel tank, the method comprising the steps of:

forming the fuel tank, wherein the tank carries at least a first and second insert on an exterior of the tank at two spaced apart wall portions of the tank;

shaping the tank wall portions carrying the insert so that the insert defines a projection that extends at least partially radially inwardly into a tank interior;

locating a tubular body within the tank interior, aligned with the first and second inserts, the tubular body having opposing first and second ends defining openings;

placing first and second couplers each having a collar, first attachment portions, and second attachment portions between the each of the first and second ends of the tubular body and the projection of the tank wall formed by the each of the first and second inserts; and coupling the each of the first and second couplers to the first and second ends of the tubular body simultaneously with coupling the each of the first and second couplers to the each of the first and second inserts such that the each opening in the first and second ends of the tubular body receives the collar and a part of the second attachment portions formed in the each of the first and second couplers in an initial assembly position and the first attachment portions extending from the collar formed in the first and second couplers are overlapped by an interior surface of the first and second ends of the tubular body in a final assembly position, whereby the first attachment portions overlap around the projection formed by the inserts with the tank wall portions extending uninterrupted therebetween.

10. The method of claim 9, wherein the tubular body spans between the two spaced apart wall portions of the tank to limit movement of the two wall portions relative to each other in the final assembly position.

11. The method of claim 9, wherein the first attachment portions of the first and second couplers include flexible fingers having a fixed end attached to the collar and a free end extending from the collar, and the flexible fingers extend over the projection formed by the inserts with the tank wall portions.

12. The method of claim 9, wherein the second attachment portions of the first and second couplers include protrusions biased radially outwardly from the first and second couplers, and wherein the first and second ends of the tubular body have detents or apertures, and wherein the step of coupling the first and second couplers with the first and second ends of the tubular body includes engaging the protrusions with the detents or apertures.

* * * * *